(12) United States Patent
Kageyama et al.

(10) Patent No.: US 7,408,727 B2
(45) Date of Patent: Aug. 5, 2008

(54) LENS HOLDER AND LENS UNIT

(75) Inventors: Takuya Kageyama, Suwa (JP); Takashi Yamaguchi, Suwa (JP); Atsuro Yajima, Chino (JP)

(73) Assignee: Nittoh Kogaku K.K., Nagano (JP)

( * ) Notice: Subject to any disclaimer, the term of this patent is extended or adjusted under 35 U.S.C. 154(b) by 67 days.

(21) Appl. No.: 11/226,643

(22) Filed: Sep. 14, 2005

(65) Prior Publication Data

US 2006/0061888 A1 Mar. 23, 2006

(30) Foreign Application Priority Data

Sep. 17, 2004 (JP) ............... 2004-272504
Sep. 29, 2004 (JP) ............... 2004-284141

(51) Int. Cl.
G02B 7/02 (2006.01)
G02B 7/00 (2006.01)

(52) U.S. Cl. ............... 359/819; 359/503

(58) Field of Classification Search ............... 359/819, 359/726, 808, 811, 818, 503, 822, 823
See application file for complete search history.

(56) References Cited

U.S. PATENT DOCUMENTS 6,327,103 B1* 12/2001 Belliveau et al. ............ 359/819
6,441,976 B1* 8/2002 Okorocha ................. 359/820
6,748,967 B1* 6/2004 Smiltneek ............... 137/315.17
6,829,111 B2* 12/2004 Fujisawa et al. ............ 359/822

FOREIGN PATENT DOCUMENTS

| JP | 06-138386 | 5/1994 |
|---|---|---|
| JP | 2001-092006 | 4/2001 |
| JP | 2001-166380 | 6/2001 |
| JP | 2002-040308 | 2/2002 |
| JP | 2003-215702 | 7/2003 |
| JP | 2004-138913 | 5/2004 |
| JP | 2004-205715 | 7/2004 |
| JP | 2004-205716 | 7/2004 |
| JP | 2004-271700 | 9/2004 |
| JP | 2004-279475 | 10/2004 |

* cited by examiner

Primary Examiner—Ricky L Mack
Assistant Examiner—Brandi N Thomas
(74) Attorney, Agent, or Firm—Thompson Hine LLP (57) ABSTRACT

A lens holder holds a plurality of lenses aligned in a direction of an optical axis. This lens holder is at least partially assembled from subunits divided on a plane that includes the optical axis. In a connecting shell that connects a first shell and a second shell and holds an optical element for bending an optical path, an optical path of only one subunit is effectively used. The connecting shell includes a first connecting structure for connecting to the first shell and second connecting structures for connecting to the second shell, the second connecting structures being disposed at two symmetrical positions around the first optical axis.

19 Claims, 8 Drawing Sheets

LENS HOLDER AND LENS UNIT

CROSS-REFERENCE TO RELATED APPLICATIONS

This application is based upon and claims the benefit of priority from the prior Japanese Patent Applications No. 2004-272504, filed Sep. 17, 2004; and No. 2004-284141, filed Sep. 29, 2004, the entire contents of both of which are incorporated herein by reference.

BACKGROUND

The present invention relates to a holder for a lens system that is suited to an image display device that magnifies and projects, onto a screen, an image displayed on a light modulator, such as a liquid crystal display device, a DMD, or the like, to a lens unit in which such lens system is incorporated, and to an image display device having such lens unit.

A lens unit used in a camera, projector, or the like is produced by holding a lens system composed of a plurality of lenses in a cylindrical holder which is then incorporated in an apparatus. Japanese Laid-Open Patent Publication No. 2002-40308 discloses a lens apparatus constructed by holding a plurality of lenses in lens holding cylinders with the lenses sandwiched between contact surfaces of the lens holding cylinders and pressing rings.

To hold a plurality of lenses at predetermined positions, the above lens apparatus needs to have a large number of lens holding cylinders and a large number of pressing rings. This means, not only a large number of components but also a considerable time are required for assembling.

Also known is a rear-projection-type projector (hereinafter simply "rear projector") that uses a projection lens to project projecting light from a light modulator (a light valve or an image forming device), which forms an image by modulating light according to an image signal, onto a screen from the rear surface of the screen.

As a rear projector, a projector that uses a lens unit to magnify and project an image formed by a light modulating device such as a liquid crystal display (LCD) device or a DMD (digital mirror device) onto a screen from behind the screen is also known. Such rear projectors can produce a large image in spite of being slim in depth, and therefore are being subjected to much attention as next generation image display apparatuses. To display a high-resolution image on a par with a conventional high-resolution television using a rear projector, a lens unit with high optical performance that includes a high aberration-correcting performance and limited fluctuation in focal distance due to temperature is required.

In such a lens unit, there are many lenses to be held by lens holders and there are rising demands on the lens holders used to hold the lenses at predetermined positions. On the other hand, to mass produce rear projectors at low cost as domestic appliances, it is necessary to manufacture lens units with a large number of lenses at low cost and in a short time while maintaining high performance.

Japanese Laid-Open Patent Publication No. H06-138386 discloses a projector where a prism or mirror that bends the optical path is disposed midway in a lens group that composes a lens system to change the optical path.

SUMMARY

One of aspects of the present invention is a lens holder for holding a plurality of lenses that are aligned along a direction of an optical axis, wherein at least part of the lens holder is assembled from subunits that are divided on a plane including the optical axis.

In a part where a plurality of lenses are disposed in a straight line so that the respective centers of the lenses match the optical axis, the outer circumferences of the plurality of lenses aligned in a row in the direction of the optical axis are symmetrical around the optical axis. Accordingly, when the lens holder is divided on a plane including the optical axis, the units (subunits) produced by the division have a symmetrical form, and therefore the subunits produced by the division can be formed with a same shape (by molding using the same mold). A predetermined part of the lens holder can therefore be formed by assembling subunits of the same shape so that the divided surfaces thereof face one another. In this specification, units (subunits) produced by dividing on a plane including an optical axis are referred to as "clamshell-type units or clamshell units".

The lens holder is a clamshell-type holder that is produced by joining two subunits (clamshell-type units) manufactured from a single mold. This means that the lens holder can be manufactured at low cost. Also, in this holder, the respective lenses are supported from the radial direction by a plurality of subunits that have the same structure and the same tolerances. There is the advantage that the respective centers of a plurality of lenses can be easily aligned on the optical axis. Accordingly, a clamshell-type holder can be favorably used as a holder for holding a projection lens system of a rear projector expected to project images with a similar or higher quality to a conventional television set.

A lens holder that is at least partially assembled by two subunits (clamshell units) divided into two on the plane including the optical axis is an example where the minimum number of subunits need to be assembled. In these subunits, lenses can be attached to the units in a direction perpendicular to the optical axis, that is, in the radial direction of the respective lenses. Accordingly, in the holder, between the two clamshell units, a number of lenses can be arranged freely by supporting the two clamshell units even if the sizes of lenses are not sequential. To hold many lenses at predetermined positions and at predetermined intervals, constructions, such as convexes and concaves, grooves, and ribs can be provided for holding individual lenses on the inner surfaces of the clamshell units.

Another aspect of the present invention is a lens holder including shells provided with connecting structures. When the optical path is bent within the lens system, it is necessary to also bend the optical axis within the lens holder. The arrangement of the plurality of lenses held in the lens holder will therefore not be symmetrical around either of the optical axes. Accordingly, it is difficult to provide a clamshell-type holder by merely dividing in a plane including the optical axes. The lens holder is instead divided into a plurality of shells for holding the respective lens groups whose optical axes are in different directions. It is possible to provide the respective shells with clamshell-type units. The part that bends the optical path is where the optical axes intersect, and it is preferable to provide a shell that includes such part or a shell that constructs such part with a clamshell-type structure.

In the lens holder including a first shell for holding a first lens group that includes lenses aligned along a direction of a first optical axis, a second shell for holding a second lens group that includes lenses aligned along a direction of a second optical axis, and a connecting shell for holding an optical element that bends an optical path between the first lens group and the second lens group, the connecting shell is assembled from two subunits of a same shape divided on a plane including the first optical axis and the second optical axis. In this connecting shell, an optical path of only one of the subunits is effectively used, and the connecting shell includes a first connecting structure for connecting to the first shell and second connecting structures for connecting to the second shell, the second connecting structures being disposed at two positions that are symmetrical around the first optical axis.

In a lens holder for holding a lens system for projecting light from a light modulator onto a screen, out of the first lens group and the second lens group included in the lens system, one lens group is disposed on a light modulator side of the lens holder and the other lens group is disposed on a screen side of the lens holder. Accordingly, the second connecting structures disposed at two positions that are symmetrical around the first optical axis may be on the light modulator side to the connecting shell, on the screen side, or on both sides.

The connecting shell includes a first connecting structure for connecting to the first shell and second connecting structures for connecting to the second shell, the second connecting structures being disposed at two positions that are symmetrical around the first optical axis. Accordingly, the connecting shell has a shape of replaceable by certain degree around the first optical axis including the second connecting structures. Such connecting shell that has a symmetrical external shape around the first optical axis can be produced as a clamshell-type shell. Accordingly, in the same way as the first and/or second shell, the connecting shell can also be produced as a clamshell-type shell.

In the connecting shell, the optical path of only one subunit is effective or effectively used. Accordingly, the internal construction of the connecting shell does not need to be symmetrical about the first optical axis. This means that it is possible to hold an optical element, such as a mirror or a prism, of an asymmetrical shape for bending the optical path.

The connecting shell may include a part for holding lenses or a lens group. The connecting shell may be combined with the first shell. A first shell including a connecting function is provided with a connecting part for holding an optical element that bends the optical path between the first lens group and the second lens group and is assembled from two subunits of the same shape that are divided on a plane including a first optical axis and a second optical axis, where in at least a connecting part, the optical path of only one subunit is effective, and the first shell includes connecting structures for connecting to the second shell that are disposed at two symmetrical positions around the first optical axis.

In the connecting shell, the angle by which the optical path is bent is not limited to 90°. However, for a lens holder where the first and second optical axes intersect at 90° inside the connecting shell so that a lens system where the optical path is bent by 90° can be housed, the second connecting structures disposed at two symmetrical positions are aligned in a straight line, which is an example of a comparatively simple structure. In this case, when the second connecting structures disposed at two positions aligned in a straight line are flanges, the gap between the flanges is narrow, which makes it difficult to manipulate screw in screw holes on the flanges. Accordingly, the respective flanges should preferably be provided with screw holes and clearance holes. The respective clearance holes are formed at positions facing the screw holes of the other flange and are sized so that a tool can be inserted therethrough. This structure for the connecting shell can also be applied to shells whose internal optical axis is straight.

So long as the pitch of the screw holes on the subunits to be screwed together matches, no positional relationship between the screw holes and the clearance holes is required on the same flange. At both connecting flanges, it is possible to form the screw holes and the clearance holes near one another, with a structure where pairs of screw holes and clearance holes are formed at equal angular intervals at both ends of the connecting subunit being one favorable aspect since this makes positioning and assembly easy.

Another aspect of the present invention is a lens unit including the above lens holder and a plurality of lenses held by the lens holder. A further aspect of the present invention is an image displaying apparatus including the above lens unit, a screen, and a light modulator, where projecting light from the light modulator is bent and projected onto the screen. This type of image displaying apparatus is suited to use as a slimline rear projector.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
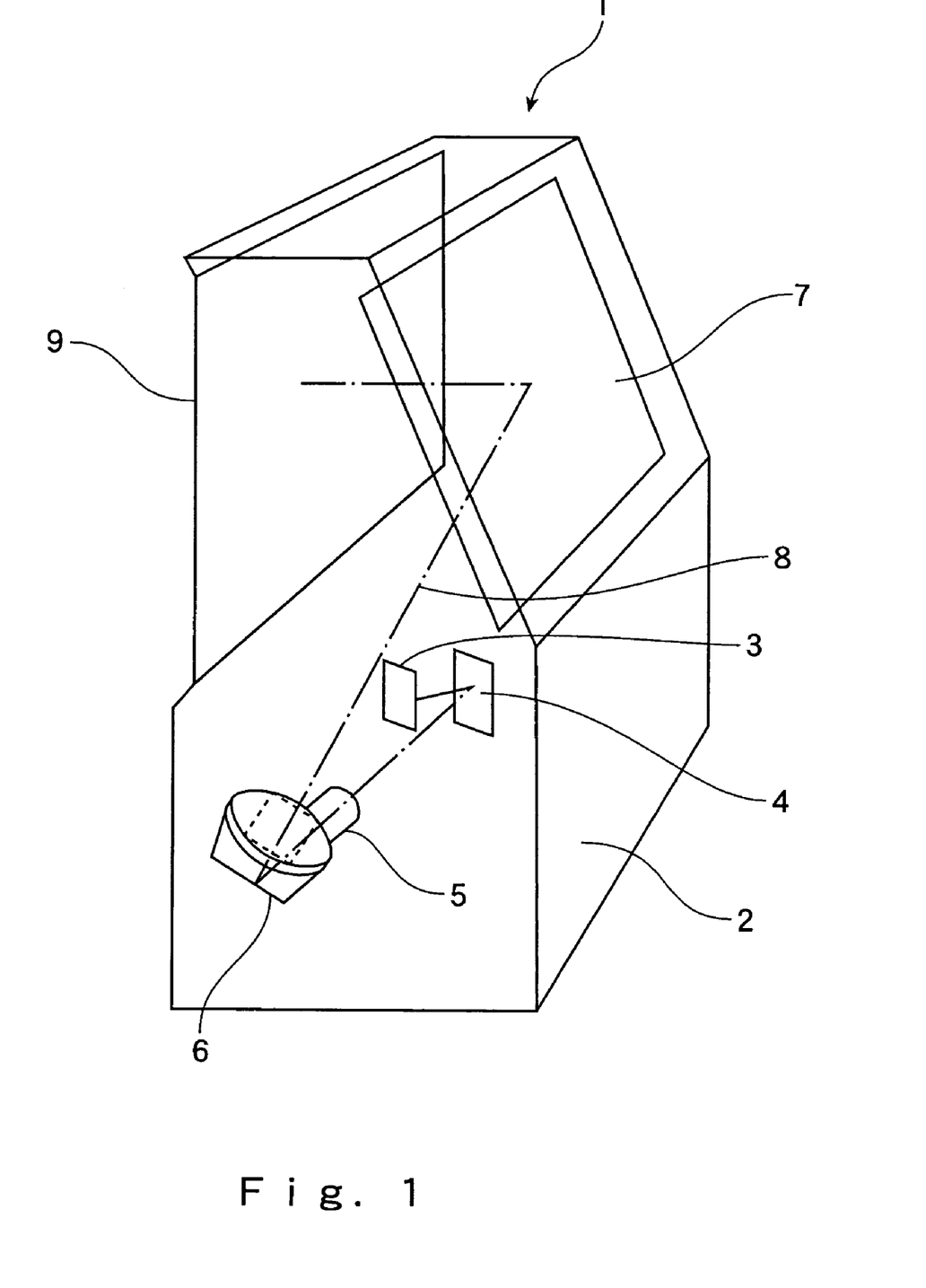
FIG. 1 is a perspective view showing the overall construction of a rear projector.

FIG. 1 schematically shows a rear projector 1 including a lens unit. The rear projector 1 includes, inside a housing 2, a light source 3, a light modulator (light valve) 4 that modulates light from the light source 3 based on an image signal to form an image, a lens unit 5 for magnifying and projecting the image formed on the light valve 4, and a mirror 7 that reflects projecting light 8 to a screen 9. The screen 9 is disposed on a surface of the housing 2 and an image on the light valve 4 is magnified and projected onto the screen 9 from the rear surface thereof by the lens unit 5. A liquid crystal display device panel, a DMD panel composed of micromirror elements, or the like is used as the light valve 4.

Figure 2:
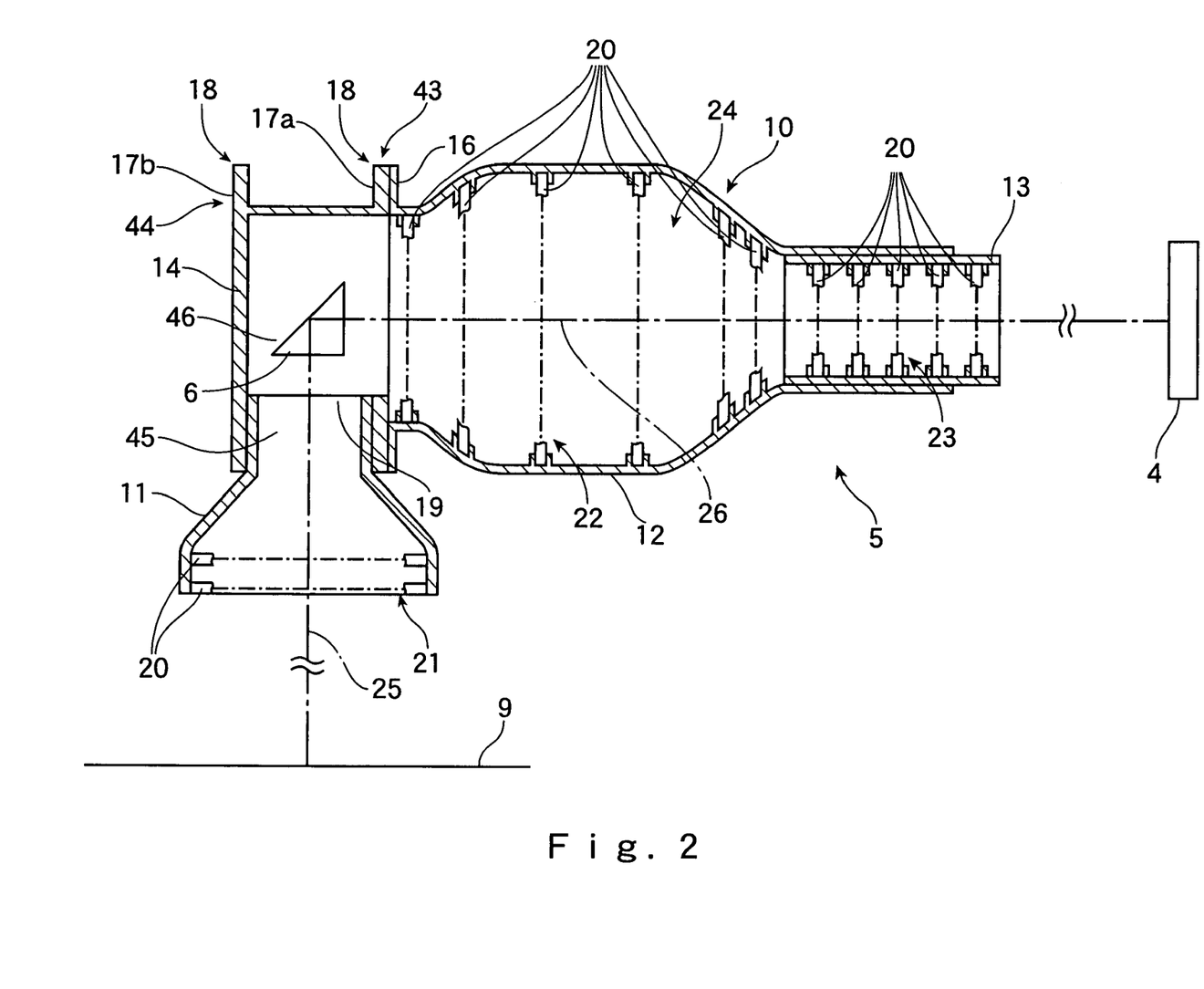
FIG. 2 is a cross-sectional view showing the overall construction of a lens unit.

FIG. 2 schematically shows the lens unit 5 used for projection. The lens unit 5 is equipped with a lens system 24, which includes a plurality of lenses 20 that have circumference of circle and a prism 6 as an optical element for bending an optical path inside the lens unit 5, and a lens holder 10 for housing the lens system 24. The lens holder 10 is formed in an overall L-shape. Light is bent by 90° (90 degrees) inside the lens unit 5 by the prism 6 enclosed in the lens holder 10 and projecting light is outputted from the lens unit 5. This projecting light is projected onto the screen 9 via the mirror 7 to form an image. Accordingly, the lens holder 10, the lens unit 5, and the rear projector 1 are the aspects of the present invention.

The lens system 24 is composed of a first lens group 21, a second lens group 22, and a third lens group 23 disposed in this order from the side of the screen 9. The first lens group 21 is disposed on the screen side of the prism 6 and the second lens group 22 and the third lens group 23 are disposed on the light valve side of the prism 6.

The lens holder 10 includes a cylindrical first shell 11 for constructing a first sub-holder for housing and holding the first lens group 21, a cylindrical second shell 12 for constructing a second sub-holder for housing and holding the second lens group 22, a cylindrical third shell 13 for constructing a third sub-holder for housing and holding the third lens group 23, and a fourth shell 14 for constructing a fourth sub-holder for connection purposes that holds the prism 6 and has an optical path which is bent by 90°.

Out of these shells 11 to 14, a part connecting of the third shell 13 and the second shell 12 has a configuration for positional adjustment. The fourth shell 14 for connection purposes is connected to the second shell 12 using a flange 17a and is screwed to the first shell 11 in a direction perpendicular to the connection to the second shell 12. Accordingly, the first shell 11 is attached in the direction of the screen 9 at an angle of 90° to the second shell 12 and has a configuration for positional adjustment with respect to the second shell 12 via the fourth shell 14.

Figure 3:
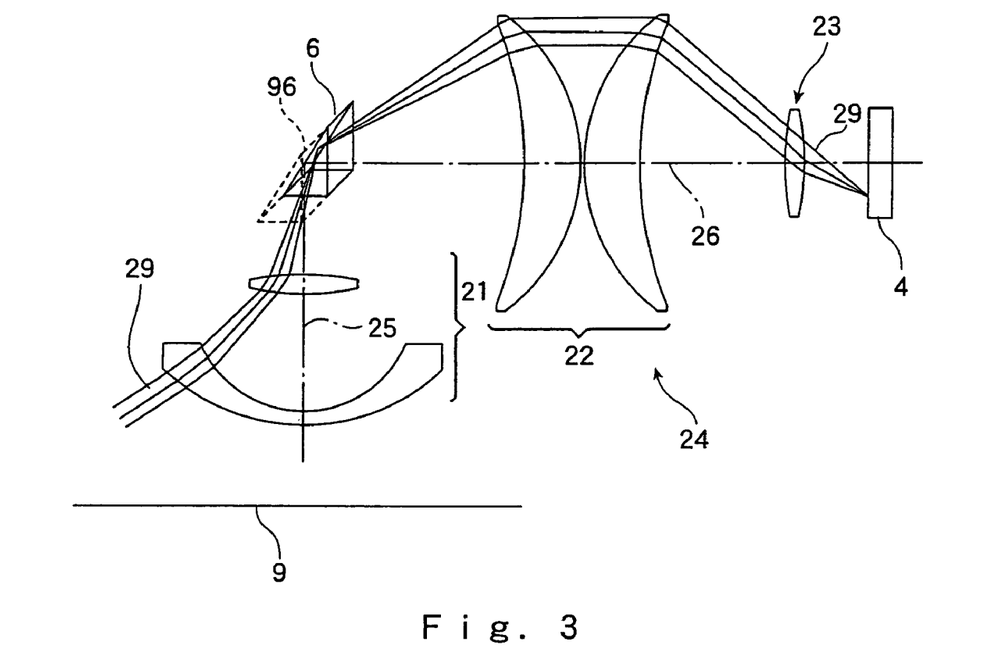
FIG. 3 is a diagram showing an optical system of the lens unit shown in FIG. 2.

FIG. 3 schematically shows an optical system of the lens system 24 of the lens unit 5 that includes the lens groups 21 to 23 and the prism 6. It should be noted that various lenses in the lens groups 21 to 23 have been omitted from FIG. 3, and the optical path is also schematically illustrated. Projecting light 29 for image forming delivered by the light valve 4 is processed by the third lens group 23 and the second lens group 22 disposed along an optical axis 26. At the position of the prism 6, the angle of the projecting light 29 is changed to an optical axis 25 using a half region along the optical axis 25 that indicated on FIG. 3 as the region to the rear of the optical axis 26 to the plane of this drawing. The projecting light 29 reflected by 90° (in three-dimensions) by the prism 6 is processed by the first lens group 21 disposed along the optical axis 25 and is outputted toward the screen 9.

Accordingly, as the prism 6, only the part behind the plane including the optical axis 25 and 26 on FIG. 3 is required and a part 96 shown by the broken line is not required and is not included in the lens unit 5. For this reason, in the fourth shell 14 that holds the prism 6, in optical terms, only half of the area of a cross section of the optical path formed inside the fourth shell 14 is used effectively.

In a system such as an inclined projection system that projects an image in a direction inclined by a predetermined angle to the screen, an image that is trapezoidally inclined is projected onto the screen. Accordingly, to project an image of the desired size and shape onto the screen, the image to be projected onto the screen is formed having been trapezoidally corrected in advance on the light valve and is then projected using the lens unit.

This means that the image that passes the lens unit is an image that has been corrected to an overall trapezoidal shape and therefore is not rectangular or square. When using a lens unit effectively, that is, when projecting a large image using small-diameter lenses, it is desirable to use as much of the lens area as possible to effectively magnify and project images. It is preferable for the long side of a trapezoidal image to be processed on a reason at or near the diameters of the lenses that run through centers of the lenses. For the short side of the trapezoidal image, it is preferable to be processed at the circumference of the lenses.

In slimline rear projectors, the screen is inclined at a larger angle to the optical axis of the lenses, and therefore trapezoid correction where the ratio of the long side to the short side is high is required. One of the most effective usages of the lenses for such equipment is inputting an image with the long side of the trapezoid aligned with the diameter of the lenses. In this case, half of the area of the lenses is used to process images. For an optical element at a part that bends the optical path, by designing the optical system so that half the area with respect to the optical axis is used, symmetry around the optical axis is not required for the optical element. For a holder that supports such optical element, the shape that supports the optical element does not need to be symmetrical around the optical axis.

The rear projector 1 uses an optical system where the projection lens unit 5 projects projecting light diagonally from below the screen 9 via the mirror 7. To prevent trapezoid distortion of the image on the screen 9, as described above, an image that has been trapezoidally corrected is formed on the light valve 4. When projecting an image onto the screen 9, when the trapezoid distortion is large, the lens area can be most effectively used by aligning the base side of the corrected image with the diameters of the lenses and processing the projecting light using almost half of each lens.

In the lens system 24 housed in the lens unit 5, it is efficient to apply an optical design that limits the optically effective part of the prism 6 that bends the optical path by 90° to the region located behind the plane that includes the optical axes 25 and 26 on the drawing of FIG. 3. Accordingly, it is possible to obtain desired optical performance by disposing the prism 6 so as to reflect the projecting light from the second lens group 22 to the first lens group 21 in such region only. Since the effective projecting light dose not pass the other region at the bending part, it is preferable for the light in such region to be absorbed without being reflected.

Figure 4:
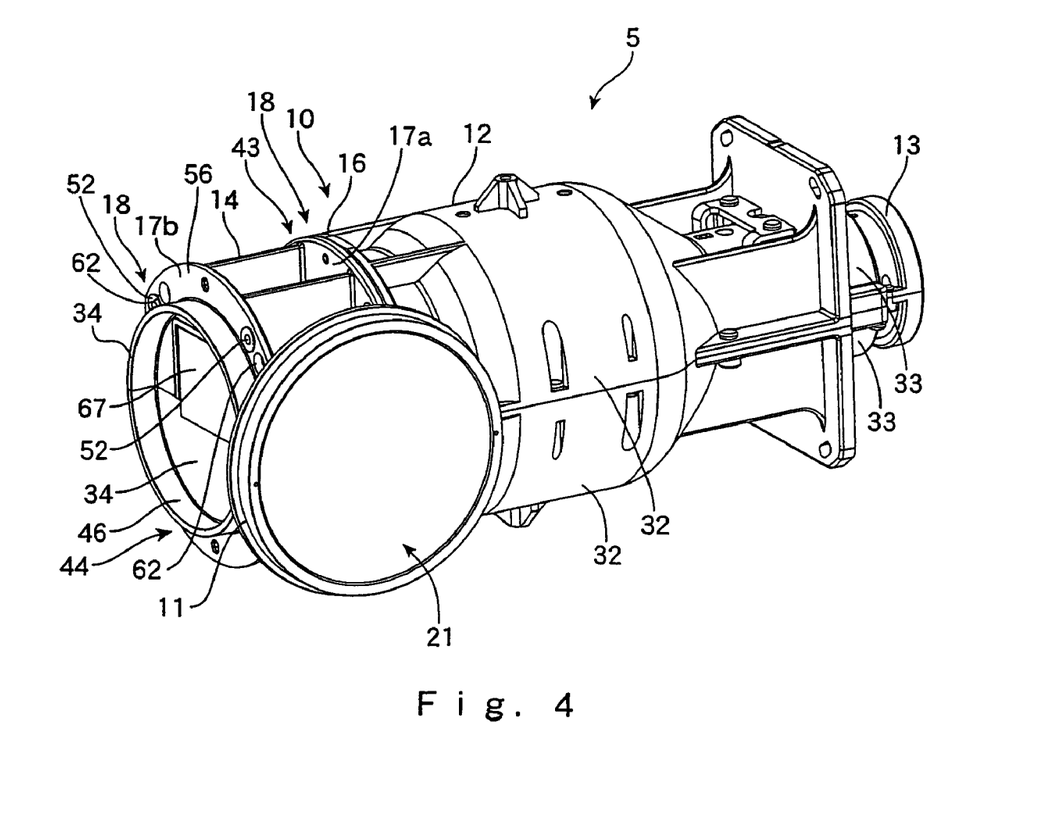
FIG. 4 is a perspective view showing the outside of the lens unit shown in FIG. 2 in state where respective shells of the lens unit are connected.
Figure 5:
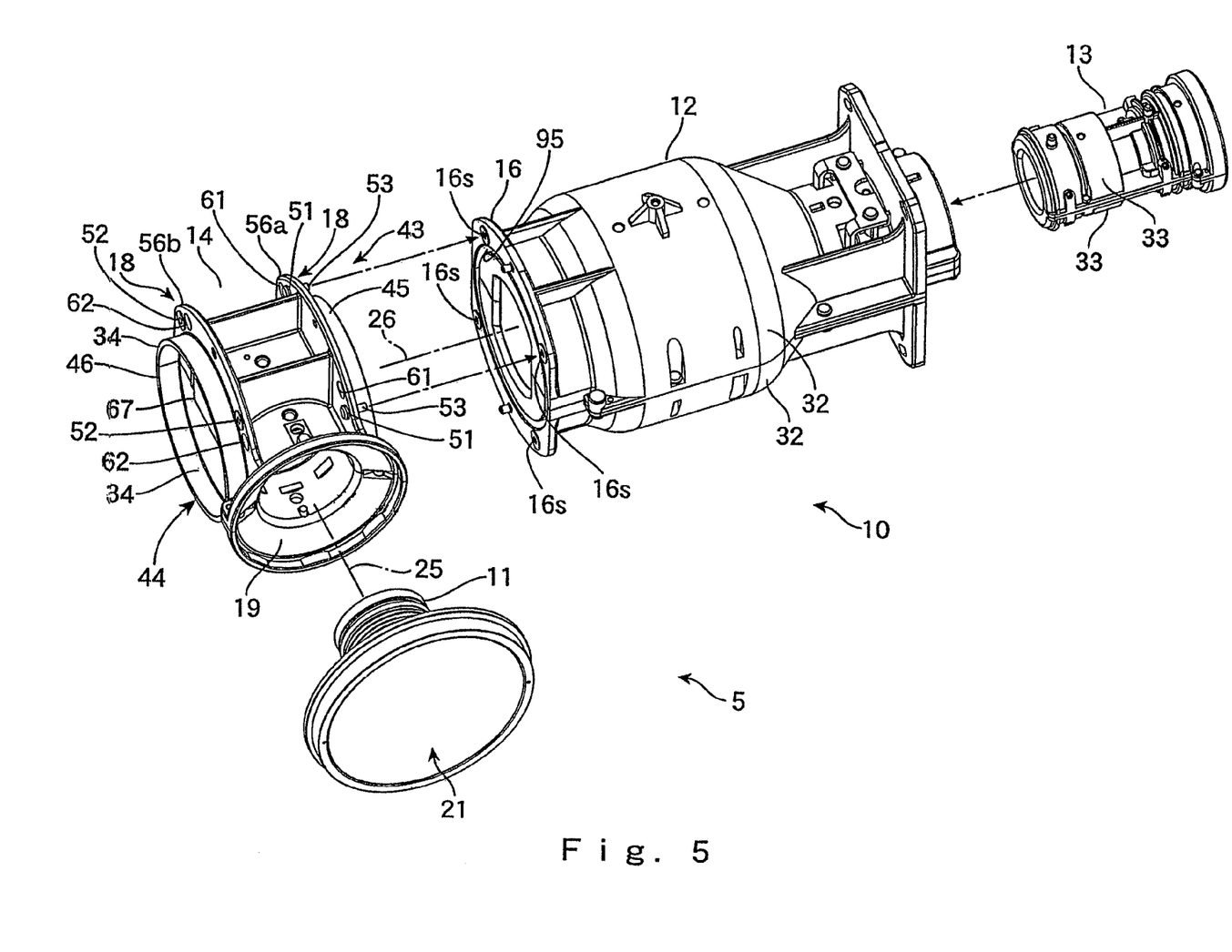
FIG. 5 is a perspective view showing the outside of the lens unit shown in FIG. 2 in state where respective shells of the lens unit are separated.
Figure 6:
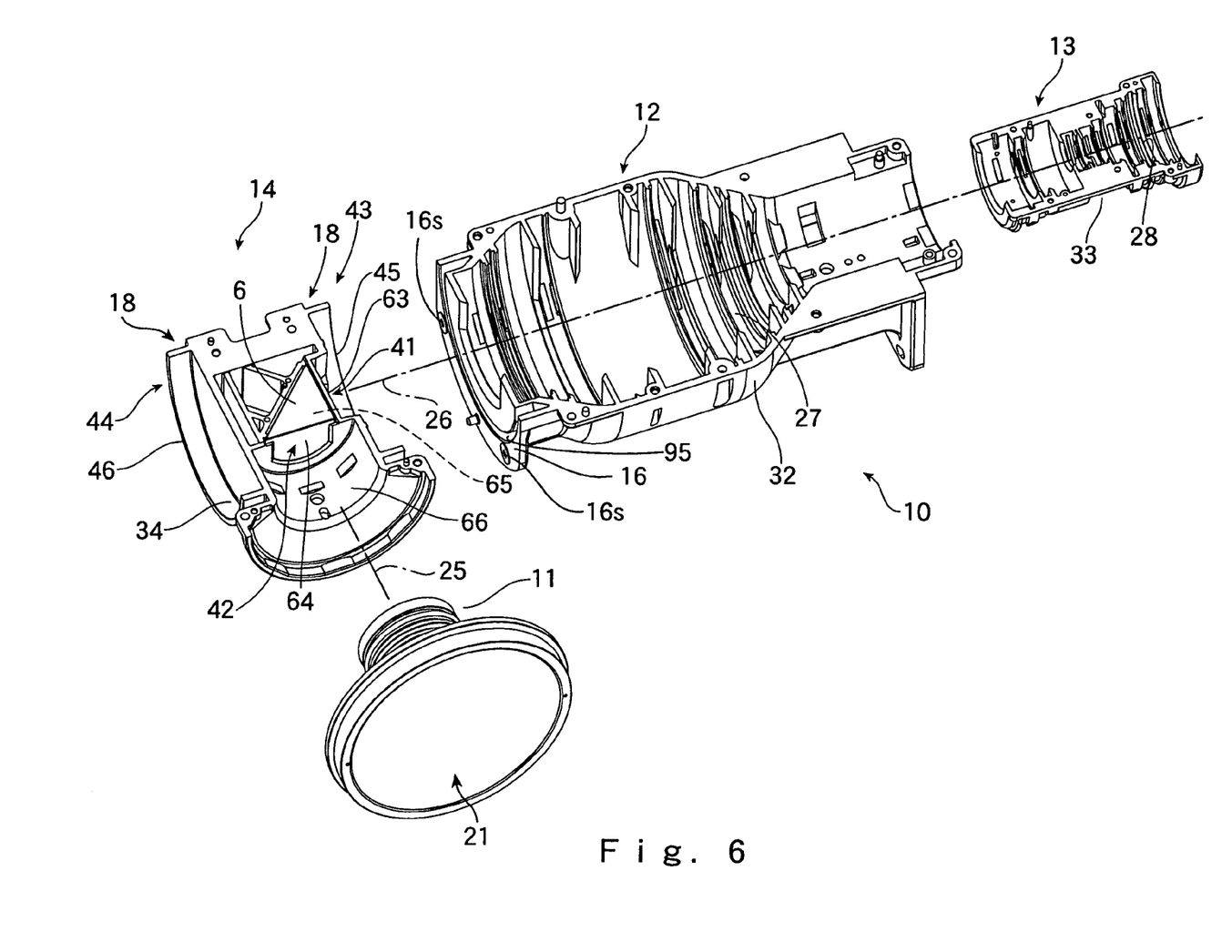
FIG. 6 is a perspective view showing subunits (clamshell-type units) that construct the respective shells of the lens holder.

FIG. 4 is a perspective view showing the detailed external appearance of the lens unit 5. FIG. 5 is a perspective view showing a state where the lens holder 10 has been split into the respective shells. FIG. 6 shows a state where the respective shells 12 to 14 have been divided into subunits. The second shell 12, the third shell 13, and the fourth shell 14 are clamshell-type holders where respective subunits in the form of clamshells are combined.

The second shell 12 is generally one cylindrical shape along the optical axis 26, includes two subunits (second subunits or second clamshell units) 32 of the same shape that are divided in the up-down (or left-right) direction on a plane including the optical axis 26, and is assembled by combining the subunits 32 by screwing the subunits 32 together, for example.

The third shell 13 is also generally one substantially cylindrical shape along the optical axis 26, includes two subunits (third subunits or third clamshell units) 33 of the same shape that are divided in the up-down (or left-right) direction on a plane including the optical axis 26, and is assembled by combining the subunits 33 by screwing the subunits 33 together, for example.

The fourth shell 14 is a shell for connection purposes, includes two subunits (fourth subunits or forth clamshell units) 34 of the same shape that are divided in the up-down (or left-right) direction on a plane including the optical axis 26 and the optical axis 25, and is assembled by combining the subunits 34.

The first shell 11 is constructed so that the arrangement of the first lens group 21 can be easily inserted from one end of the first shell 11. For this reason, the present first shell 11 is not a clamshell-type. However, the first shell 11 can be a clamshell-type holder that has two subunits of the same shape that are divided in the up-down (or left-right) direction on a plane including the optical axis 25.

The second shell 12 and the third shell 13 are substantially cylindrical with the respective lenses of the second lens group 22 and the third lens group 23 being respectively held therein from the radial direction. The second subunits 32 and the third subunits 33 include constructions 27 and 28 for inserting and fixing the edges of respective lenses. As the constructions 27 and 28 that hold the lenses, it is possible to use convexes/concaves, grooves, ribs, or the like that press the front and rear surfaces of the lenses. When assembling the lens unit 5, the lenses 20 of the second lens group 22 are respectively inserted into one of the two second subunits 32 and then the other second subunit 32 is attached to cover the lenses 20. By doing so, the cylindrical second shell 12 is assembled and at the same time, the lenses 20 included in the second lens group 22 are held at predetermined positions in the second shell 12. This is also the case for the third shell 13.

When a clamshell-type holder is used where subunits of the same shape are joined together, the two subunits to be joined together are molded using the same mold and therefore the manufacturing tolerance for the subunits is the same. Since the plurality of lenses are held by subunits with the same manufacturing tolerance, the respective lenses of the second lens group 22 and the third lens group 23 can be precisely held in a straight line centered on the optical axis 26. Accordingly, the optical axes of a plurality of lenses included in the lens unit 5 can be easily aligned and a lens unit with high optical performance can be manufactured with a favorable yield and at low cost.

The third shell 13 is inserted into the second shell 12 from one end thereof, the position relative to the second shell 12 is adjusted, and then the third shell 13 is fixed by screws or the like. With this construction, the optical distance (i.e., the distance along the optical axis 26) between the second lens group 22 held by the second shell 12 and the third lens group 23 held by the third shell 13 becomes adjustable to correct the focus of the lens unit 5 and/or to correct aberration.

A joined part of the second shell 12 and the fourth shell 14 is composed of flanges 16 and 17a whose overall shape is almost quadrangular. By placing these flanges 16 and 17a together and screwing the flanges 16 and 17a together, the positions of (distance between) the second lens group 22 held by the second shell 12 and the prism 6 held by the fourth shell 14 are fixed. The shell 14 is provided, at a position that is perpendicular direction to a connecting direction of the flange 17a for the second shell 12, with a funnel-shaped connection opening 19 that is a connecting structure (first connecting structure) for inserting the first shell 11. The first shell 11 is inserted into the connection opening 19 of the fourth shell 14, the position along the optical axis 25 is adjusted, and the first shell 11 is then screwed on. By doing so, the positions of the prism 6 held by the fourth shell 14 and the first lens group 21 held by the first shell 11 are fixed. As a result, the optical distance (i.e., the distance along the optical axis 26 and the optical axis 25) between the second lens group 22 held by the second shell 12 and the first lens group 21 held by the first shell 11 can be adjusted to correct the focus of the lens unit 5 and/or correct aberration.

Figure 7:
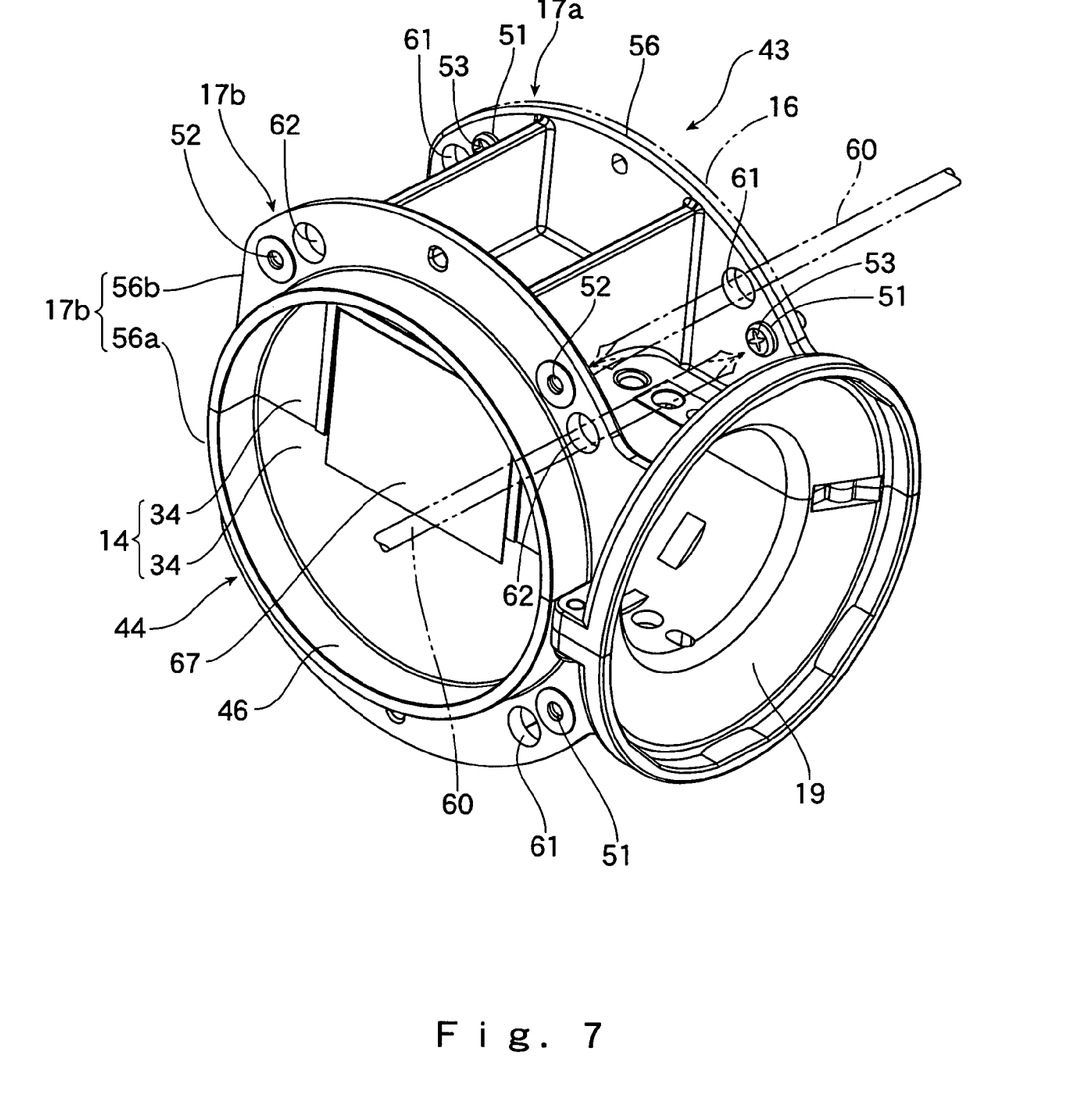
FIG. 7 is a perspective view showing a connecting shell shown in FIG. 6.
Figure 8:
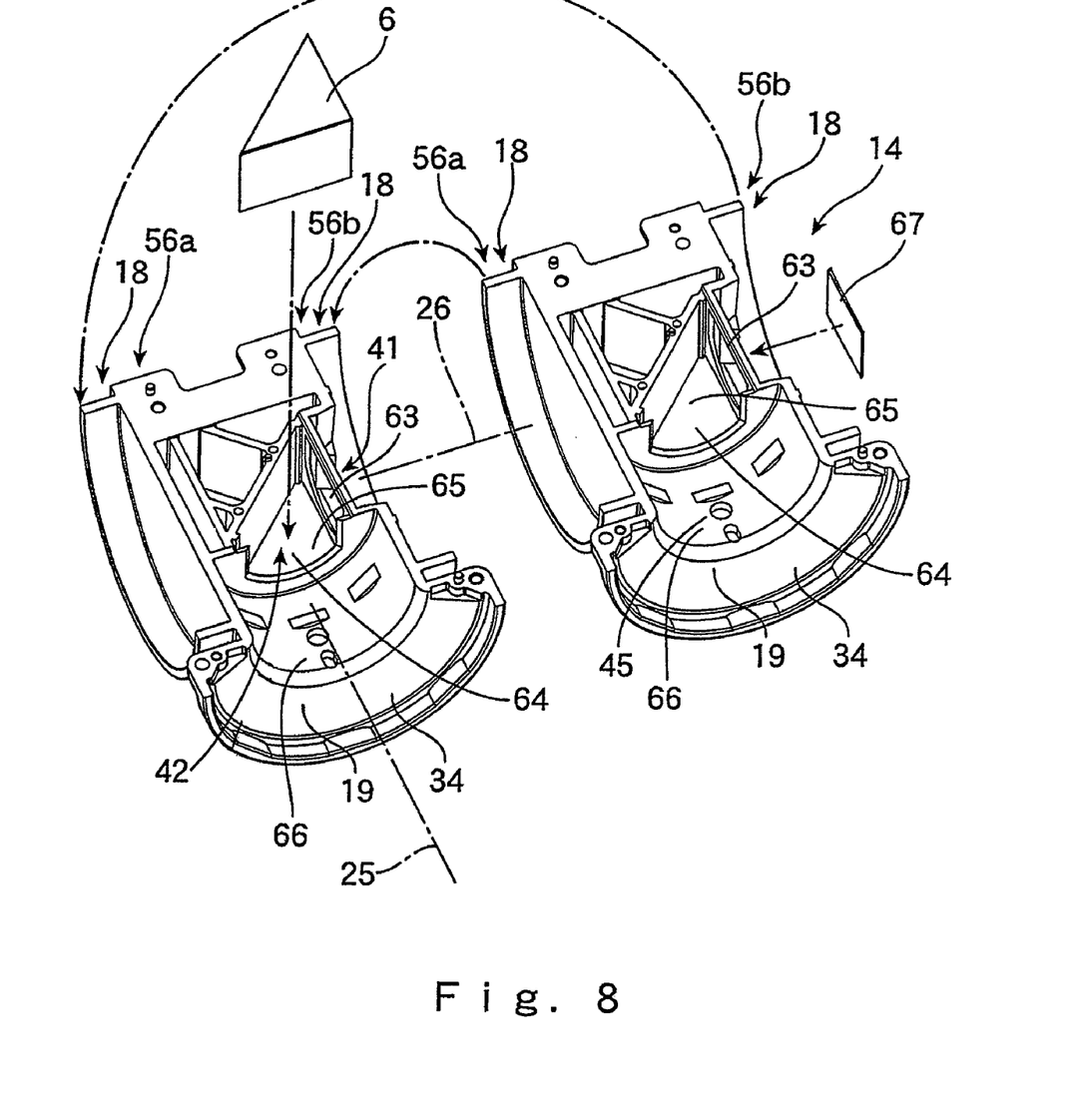
FIG. 8 is a perspective view showing a state where the connecting shell shown in FIG. 7 is divided into subunits.

FIG. 7 is a perspective view showing the fourth subunits 34 that have been removed from the lens unit 5. FIG. 8 is a perspective view showing the fourth shell 14 after division into the fourth subunits (the fourth clamshell units) 34. The fourth subunits 34 are provided with a triangular housing part 65 in which the triangular prism 6 that is the optical element for bending the optical path is housed, a semi-conical concave part 66 that forms the connection opening 19 into which the first shell 11 is inserted, and connecting structures 18 including flanges 17a and 17b for connecting to the second shell 12. In the triangular housing part 65, the side 41 that faces one of the flanges (for example, the flange 17a) and a side 42 that faces the connection opening 19 for the first shell 11 are both open and allow light to pass. The housing part 65 of the fourth shell 14 forms an optical path where the light incident via an opening 63 that faces one side out of the connecting structures 18 is bent by 90° by the prism 6 and is outputted from the opening 64 to the connection opening 19.

The connecting structures 18 are formed at two symmetrical positions around the optical axis 25. That is, the fourth shell 14 includes, at symmetrical positions about the optical axis 25, two connecting structures (second connecting structures) 18 to which the second shell 12 can be connected. This means the external shape of the fourth shell 14 for connection purposes is symmetrical about the optical axis 25 of the first shell 11. The connection opening (first connecting structure) 19 for the first shell 11 fundamentally has a circular shape and is symmetrical about the optical axis 25. When the fourth shell 14 is rotated by 180° about the optical axis 25, it is possible to attach the second shell 12 and to attach the first shell 11.

According to such shape of the fourth shell 14, it can be constructed of two subunits 34 of the same construction. The respective subunits 34 are provided with half flange units 56a and 56b and when the subunits 34 are combined around the optical axis 25 as shown in FIG. 8, the flanges 17a and 17b either of which the second shell 12 can be connected are assembled at both ends 43 and 44 at symmetrical positions.

The housing parts 65 for holding the prism 6 of respective subunits 34 form part of optical paths and the respective optical paths extend across each other when the fourth shell 14 is assembled by the subunits 34. When the optical path 65 of one of the subunits 34 is disposed so as to be oriented from the second shell 12 to the first shell 11, the optical path 65 of the other subunit 34 is oriented in the opposite direction to the second shell 12 and does not transmit effective projecting light. As described above with reference to FIG. 3, for the lens system 24 housed in the lens unit 5, the optical design is used where only half of a plane perpendicular to the optical axes 25 and 26 needs to be effective at the position where the prism 6 is disposed to bend the optical path. Accordingly, the fourth shell 14 for connection purposes produced by combining subunits 34 of the same shape has no demerits in optical terms. By using the prism 6 set in one of the subunits 34, the projecting light 29 from the second lens group 22 in the second shell 12 is effectively reflected and reoriented by 90° and then supplied to the first lens group 21 of the first shell 11.

One out of the subunits 34 of the fourth shell 14 is not used optically. Accordingly, no prism 6 is provided on the optical path 65 of the one of the subunits 34. The opening 63 of the one of the fourth subunits 34 in which no prism 6 is disposed should preferably be shielded by an appropriate blocking member 67 such as black tape.

The flanges 17a and 17b of the connecting structures 18 of the fourth shell 14 that exhibit rotational symmetry and are disposed at positions exchangeable each other are provided with screw holes 52 formed at angular intervals so as to face screw holes 16s provided in the flange 16 of the second shell 12. Clearance holes 62 through which a screw tightening tool can pass are provided in the flanges 17a and 17b at positions that are slightly shifted from the screw holes 52, with the positions of the screw holes 52 and the clearance holes 62 alternating on the flanges 17a and 17b, respectively. That is, the respective flanges 17a and 17b are provided with the screw holes 52 and clearance holes 62. The respective clearance holes 62 of one flange, i.e. flange 17b are formed at positions facing the screw holes 52 of the other flange, i.e. flange 17a. In addition, the clearance holes are sized so that a tool can be inserted therethrough. Accordingly, even if the flange 17b is provided on the side that is not connected to the second shell 12, it will be possible to screw together the flanges 17a and 16 by passing a tool through the flange 17b.

Two screw holes 51 and two clearance holes 61 are formed in the half flange part 56a of each subunit 34 of the fourth shell 14, and two screw holes 52 and two clearance holes 62 are also formed in the other half flange part 56b. The respective holes are formed at positions so that the screw holes 51 of the half flange part 56a face the clearance holes 62 of the other half flange part 56b and the screw holes 52 of the half flange part 56b face the clearance holes 61 of the half flange part 56a. The screw holes 51 and 52 are formed at positions that have a 90° pitch when the subunits 34 are combined. The clearance holes 61 and 62 are also formed at positions that have a 90° pitch when the subunits 34 are combined. On the fourth shell 14 produced by combining the clamshell-type subunits 34, both flanges 17a and 17b can be attached to the flange 16 of the second shell 12 that includes screw holes 16s at a 90° pitch.

The clearance holes 62 and 61 are formed so as to face the screw holes 51 and 52. For this reason, screws 52 inserted into the screw holes 51 and 52 can be manipulated by a tool 60 inserted through the clearance hole 62 or 61. Even if the distance between the flanges 17a and 17b is short, the screws can be easily manipulated by the tool 60.

Figure 9:
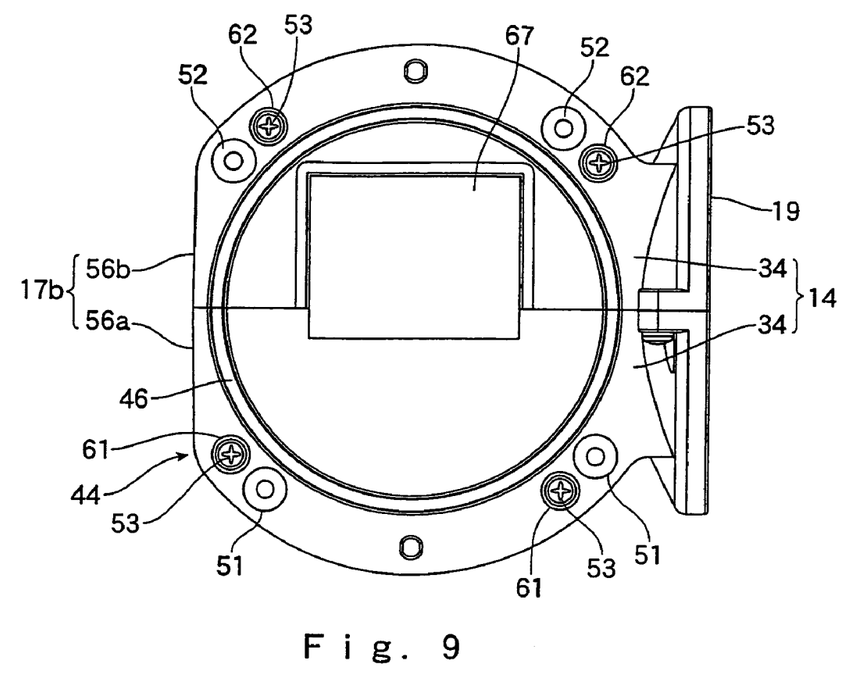
FIG. 9 is a view looking from one end of the connecting shell shown in FIG. 7.
Figure 10:
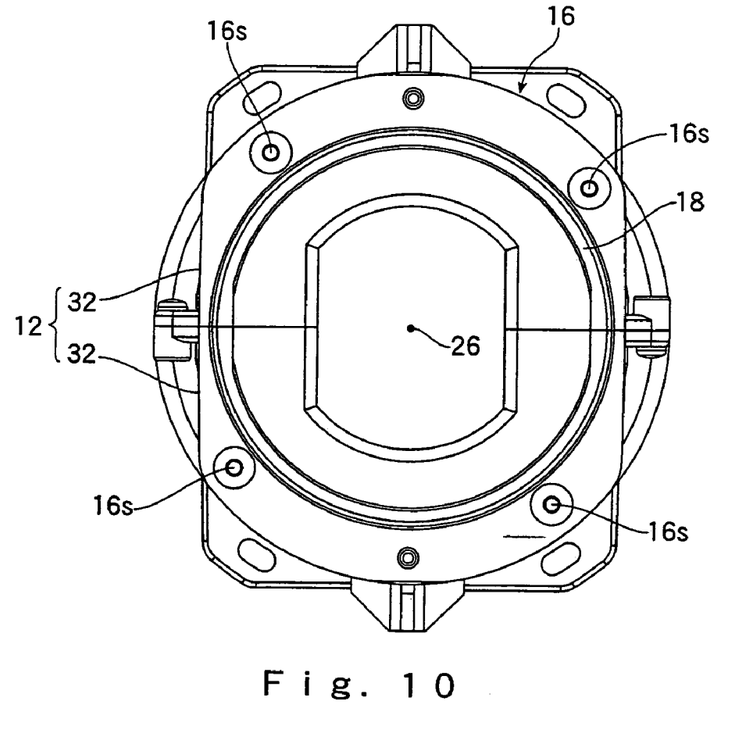
FIG. 10 is a view showing the second shell looking from the connecting shell.

FIG. 9 shows the fourth shell 14 from the opposite side to the second shell 12 along the optical axis 26. FIG. 10 shows the second shell 12 looking from the flange 16 for connecting the fourth shell 14. The clearance holes 61 and 62 are formed at positions shifted by several degrees in the clockwise direction from the screw holes 51 and 52 formed in the half flange parts 56a and 56b of the subunits 34. Accordingly, there are four pairs of screw holes numbered 51 or 52 and clearance holes numbered 61 or 62 in the respective flanges 17a and 17b, with such pairs being disposed at a 90° pitch. The side of the fourth shell 14 that faces the flange 16 of the second shell 12 has a mirror arrangement to the arrangement shown in FIG. 9. Accordingly, the clearance holes 61 and 62 are disposed at positions shifted by several degrees in the counter-clockwise direction from the screw holes 51 and 52. As shown in FIG. 10, either of the flanges 17a and 17b on both sides of the fourth shell 14 can be attached to the flange 16 of the second shell 12 in which the screw holes 16s are disposed at a 90° pitch. The position of the connection opening 19 to which the first shell 11 is attached rotates by the angle between the screw holes and the clearance holes. By using the clearance holes 61 and 62, regardless of which of the flanges 17a and 17b on opposite sides is used, the screws 53 attached to the screw holes 51 and 52 can be tightened and loosened using the tool 60.

Short cylindrical parts 45 and 46 that extend along the optical axis 26 are formed on both ends 43 and 44 of the fourth shell 14 so as to be perpendicular to the flanges 17a and 17b. A circular groove 95 that corresponds to the cylindrical part 45 or 46 is formed on the second shell 12. By connecting the fourth shell 14 and the second shell 12, the cylindrical part 45 or 46 is inserted into the groove 95 of the second shell 12. This structure increases the strength of the connection. In addition, even if gaps appear to a certain extent between the flanges, the structure having the cylindrical parts 45 or 46 and groove 95 prevents external light from penetrating into the inside of the lens holder 10. When the lens holder 10 is assembled, the structure of the cylindrical part 45 or 46 and the groove 95 functions as a guide for easily aligning the optical axis of the second shell 12 and the optical axis of the fourth shell 14. This contributes to improvements in the optical performance of the lens unit 5.

In this specification, a lens system 24 that is asymmetrical about the optical axis can be housed in a clamshell-type lens holder 10. Also, a lens unit 5 including the clamshell-type lens holder 10 with a lens system that includes an optical element 6 that bends the optical path is provided. In the lens unit 5, it is possible to hold many lenses 20 at desired positions by the lens holder 10 having fewer components and being easy to assemble. In addition, the lens unit 5 that includes a number of lenses 20 can be mass-produced with a favorable yield and at low cost, and therefore it is possible to obtain an image displaying apparatus 1 that can display sharp images using such lens unit 5.

It should be noted that although the fourth shell 14 for connection purposes is separate from the first shell 11 and the second shell 12 in the above description, such shells can also be integrated and formed as clamshell structures. One example is a lens holder where the first shell 11 is formed by a clamshell structure and is integrated with the fourth shell 14. By doing so, although there is one fewer position where the distance between lenses can be adjusted in the direction where the optical axis is bent by 90°, the number of components constructing the lens holder 10 can be reduced further. Another example is a lens holder where the second shell 12 and the fourth shell 14 for connection purposes are integrated. In this example, it is necessary to provide the first connecting structure 19 for the first shell 11 at two positions that are symmetrical about the optical axis 26.

In the above description, a prism is used as the optical element that bends the optical axis, but it is also possible to apply a different optical element such as a mirror for bending. An angle by which the optical path is bent is not limited to 90°. When the second shell 12 and the first shell 11 are combined at an angle of higher or lower than 90°, the second connecting structures 18 are provided on the fourth shell 14 at symmetrical positions about the optical axis 25 and at the same angle to the optical axis 25.

Although a rear projector and a lens system and lens holding unit suited to such rear projector have been described, a lens holding unit and lens unit according to the above description can also be applied to any system that projects an image and other optical device or optical system that uses lenses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens holder comprising:
a first shell for holding a first lens group that includes lenses aligned along a direction of a first optical axis;
a second shell for holding a second lens group that includes lenses aligned along a direction of a second optical axis; and
a connecting shell assembled from two same subunits for holding an optical element that bends an optical path between the first lens group and the second lens group, the connecting shell including a first connecting structure for connecting to the first shell and two identical second connecting structures disposed at two symmetrical positions around the first optical axis for connecting to the second shell, wherein the second shell is connected directly to only one of the two identical second connecting structures, wherein one of the two same subunits being shielded such that only the other of the two same subunits is effective to bend the optical path;
wherein each of the two same subunits being a divided unit of the connecting shell on a plane that includes the first optical axis and the second optical axis, wherein each of the two same subunits includes a half of the first connecting structure and halves of the two same second connecting structures.

2. The lens holder according to claim 1, wherein the first optical axis and the second optical axis intersect at 90° inside the connecting shell.

3. The lens holder according to claim 2, wherein the two same second connecting structures disposed at two symmetrical positions include flanges, respective flanges including screw holes and clearance holes, wherein the clearance holes of one flange are respectively formed at positions facing the screw holes of other flange and are sized for inserting a tool.

4. The lens holder according to claim 1, wherein at least one of the first shell and the second shell is assembled from two same subunits that are divided on a plane that includes at least one of the first and second optical axes.

5. The lens holder according to claim 1, wherein the lens holder is used to hold a lens system, the lens system being used to project projecting light from a light modulator onto a screen and including the first lens group and the second lens group, wherein one lens group out of the first lens group and the second lens group is disposed on a light modulator side and another one lens group out of the first lens group and the second lens group is disposed on a screen side.

6. A lens holder comprising:
a first shell assembled from two same subunits for holding a first lens group that includes lenses aligned along a first optical axis; and
a second shell for holding a second lens group that includes lenses aligned along a second optical axis;
wherein the first shell includes a connection part for holding an optical element that bends an optical path between the first lens group and the second lens groups;
wherein the first shell includes two same connecting structures for connecting to the second shell, the two connecting structures being disposed at two symmetrical positions around the first optical axis, wherein the second shell is connected directly to only one of the two same connecting structures, wherein one of the two same subunits being shielded such that only the other of the two same subunits is effective to bend the optical path;
wherein each of the two same subunits being a divided unit of the first shell on a plane that includes the first optical axis and the second optical axis, each of the two same subunits including halves of the two same connecting structures.

7. The lens holder according to claim 6, wherein the second shell is assembled from two subunits of a same shape that are divided on a plane that includes the second optical axis.

8. The lens holder according to claim 1, wherein the same second connecting structures respectively include two same connecting flanges disposed at two symmetrical positions, respective connecting flanges including screw holes and clearance holes, wherein the clearance holes of one flange are respectively formed at positions facing the screw holes of other flange and are sized for inserting a tool, wherein each of the two same subunits includes halves of the two same connecting flanges.

9. A lens unit comprising:
the lens holder according to claim 1; and
a plurality of lenses held by the lens holder.

10. A displaying apparatus comprising:
the lens unit according to claim 9;
a screen; and
a light modulator that forms an image to be projected via the lens unit onto the screen.

11. The lens holder according to claim 1, wherein the same subunits being molded from a same mold such that their configurations are substantially identical.

12. A lens holder for holding a plurality of lenses that are aligned along an optical axis, the lens holder comprising:
a first subunit;
a second subunit connected to the first subunit along a divide to form a shell; and an optical element in the shell that bends an optical path into a first optical axis and a second optical axis;
wherein the divide lies entirely in a plane that includes the first and second optical axes,
wherein the shell includes two identical connecting structures disposed at two symmetrical positions around the first optical axis for connecting to a second shell,
wherein the second shell is connected to only one of the two identical connecting structures,
wherein one of the first and second subunits is shielded such that only the other of the first and second subunits is effective to bend the optical path,
wherein each of the first and second subunits includes halves of the two same connecting structures.

13. The lens holder of claim 12, wherein the first and second subunits are molded from a same mold such that their configurations are substantially identical.

14. The lens holder of claim 12, wherein the first and second subunits of the shell are separable from each other along the divide into substantially identical halves of the shell.

15. The lens holder of claim 12, wherein the identical connecting structures respectively include two same connecting flanges disposed at two symmetrical positions, respective connecting flanges including screw holes and clearance holes, wherein the clearance holes of one connecting flange are respectively formed at positions facing the screw holes of the other connecting flange and are sized for inserting a tool, wherein each of the first and second subunits includes halves of the two same connecting flanges.

16. A lens unit comprising:
   the lens holder according to claim 12; and
   a plurality of lenses held by the lens holder.

17. A displaying apparatus comprising:
   the lens unit according to claim 16;
   a screen; and
   a light modulator that forms an image to be projected via the lens unit onto the screen.

18. A displaying apparatus comprising:
   the lens unit according to claim 16; and
   a light modulator that forms an image to be projected via the lens unit onto a screen.

19. The lens holder of claim 1, wherein both of the two same subunits include identical holding structures for holding the optical element, the optical element being received by the holding structure of only one of the two same subunits.

* * * * *